US006959075B2

(12) United States Patent
Cutaia et al.

(10) Patent No.: US 6,959,075 B2
(45) Date of Patent: Oct. 25, 2005

(54) REPLAY OF CONFERENCE AUDIO

(75) Inventors: Nicholas J. Cutaia, Brighton, MA (US); Luke K. Surazski, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 10/396,025

(22) Filed: Mar. 24, 2003

(65) Prior Publication Data
US 2004/0190700 A1 Sep. 30, 2004

(51) Int. Cl.[7] .................. H04L 12/18; H04M 1/656; H04M 3/56
(52) U.S. Cl. ............... 379/202.01; 370/260; 370/263; 379/68; 379/85
(58) Field of Search .............................. 370/259, 260, 370/263, 266, 267, 268, 269; 379/67.1, 68, 379/69, 85, 202.01, 203.01, 204.01, 205.01, 379/206.01

(56) References Cited

U.S. PATENT DOCUMENTS

| 5,382,972 A | 1/1995 | Kannes ................ 348/14.07 |
| 5,440,624 A | 8/1995 | Schoof, II ................ 379/202.1 |
| 5,483,588 A | 1/1996 | Eaton et al. ............. 379/202.1 |
| 5,572,377 A | 11/1996 | Ueno .......................... 360/31 |
| 5,668,863 A | 9/1997 | Bieselin et al. ........ 379/202.01 |
| 6,298,129 B1 * | 10/2001 | Culver et al. .......... 379/202.01 |

FOREIGN PATENT DOCUMENTS

| GB | 2 352 845 A | 2/2001 | ........... G06F 17/60 |
| WO | WO 99/23560 | 5/1999 | ............. G06F 9/46 |

OTHER PUBLICATIONS

PCT Notification of Transmittal of the International Search Report and the Written Opinion of the International Searching Authority, or the Declaration mailed Aug. 26, 2004, re PCT/US 2004/005720 filed Feb. 26, 2000 (14 pages).

* cited by examiner

Primary Examiner—Harry S. Hong
(74) Attorney, Agent, or Firm—Baker Botts L.L.P.

(57) ABSTRACT

A system enables conferencing of multiple participants within a single voice communication session. A replay module records conference audio during the conference and, at appropriate times, provides this buffered audio to selected participants of the conference.

21 Claims, 2 Drawing Sheets

REPLAY OF CONFERENCE AUDIO

TECHNICAL FIELD OF THE INVENTION

The present invention relates generally to conference systems and, more particularly, to replay of conference audio.

BACKGROUND OF THE INVENTION

Conferencing technology enables three or more callers to participate in a single telephone call. This technology has become firmly entrenched as an invaluable tool in both business and personal settings.

SUMMARY OF THE INVENTION

In accordance with the present invention, techniques for replay of conference audio are provided. According to particular embodiments, these techniques enable a conference participant to replay portions of the conference audio stream using pitch-invariant time-scale-modified playback. Other embodiments enable playback of conference audio by combining the buffered audio with the audio from the ongoing conference.

According to a particular embodiment, a method for providing conference audio replay connects to a voice communication session operable to interconnect three or more participants, receives a call on-hold indication, disables output of a real-time audio stream from the voice communication session, and stores the real-time audio stream from the voice communication session into a buffered audio stream. The method also receives a replay return indication, provides an accelerated playback of the buffered audio stream, and enables output of the real-time audio stream from the voice communication session upon finishing playback of the buffered audio stream.

According to another embodiment, a method for providing conference audio replay connects to a voice communication session interconnecting three or more participants, with the voice communication session generating a real-time audio stream. The method stores some portion of the real-time audio stream into a buffered audio stream, receives a replay audio indication, and combines the buffered audio stream with the real-time audio stream to generate a layered audio stream. The method provides the layered audio stream as output for at least one of the participants.

Embodiments of the invention provide various technical advantages. These techniques can help increase productivity and usefulness of conference calls. According to particular embodiments, a conference participant can quickly replay portions of missed audio without disrupting an on-going conference. Thus, the participant can catch up with the real-time conference without disturbing on-going discussions. For example, when a participant returns from placing a conference on hold, a replay module may quickly replay buffered audio from the conference. This brings the returning participant up to speed without requiring the other participants to recapitulate previous discussions for the returning conference participant. According to particular embodiments, accelerated replay of conference audio is provided using pitch-invariant time-scale-modified playback techniques, which enable accelerated playback without affecting the pitch of the audio. Also, a replay module can layer the buffered audio stream with the real-time conference audio to enable the user to hear the ongoing conference as background while replaying the buffered audio.

Other technical advantages of the present invention will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
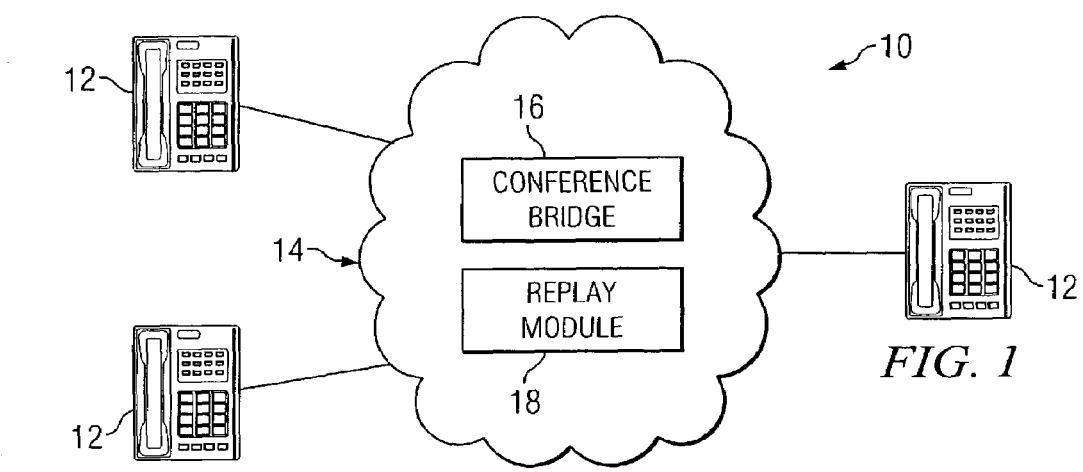
FIG. 1 illustrates a communication system that includes a conference bridge, conference participants and a replay module that operates according to particular embodiments of the present invention.

FIG. 1 illustrates a communication system, indicated generally at 10, that includes multiple telephone devices 12 interconnected by a communication network 14. Within network 14, a conference bridge 16 provides conferencing services for one or more devices 12. Network 14 also includes a replay module 18, which provides replay of portions of conference audio to selected participants of the conference. According to particular embodiments, replay module 18 provides pitch-invariant playback of indicated portions of conference audio to a single participant in a conference. According to other embodiments, replay module 18 enables playback of conference audio by combining buffered audio with the audio from the ongoing conference.

Devices 12 each represent telephony equipment, including hardware and any appropriate controlling logic, for participating in voice communication sessions. For example, devices 12 may include traditional telephones, mobile phones, packet-based phones, specially enabled computers, or any other appropriate voice communication device. In the embodiment illustrated, devices 12 interconnect using network 14. Network 14 represents any suitable combination and arrangement of network equipment operable to transport communications. Network 14 may include private networks, public networks, such as portions of the Internet or public-switched telephone network (PSTN), or any other suitable communications equipment.

To provide conferencing services to devices 12, network 14 includes conference bridge 16. Conference bridge 16 represents any suitable combination and arrangement of hardware, including any appropriate controlling logic, that can facilitate voice communication sessions between three or more devices 12. While illustrated as a separate box within network 14, system 10 contemplates the functions of conference bridge 16 being incorporated within or distributed among any suitable elements. Thus, for example, the functions of conference bridge 16 may be provided within selected devices 12 or within any suitable elements of network 14.

Replay module 18 represents any suitable hardware, including controlling logic, that provides audio replay services for participants of conferences. That is, replay module 18 replays portions of conference audio to selected participants of a conference. To provide these services for an ongoing conference, replay module 18 stores audio from the conference, interacts with conference participants, and at appropriate times, replays stored audio potentially. According to particular embodiments, replay module 18 replays buffered audio using pitch-invariant time-scale-modified playback. In the embodiment illustrated, replay module 18 is depicted as an element within network 14. However, system 10 contemplates the distribution of functions from replay module 18 among any suitable element. For example, in addition to providing typical conferencing services, conference bridge 16 may also incorporate the function of replay module 18. Similarly, selected devices 12 may provide some or all of the features as replay module 18, whether or not these devices 12 provide conferencing features such as those provided by conference bridge 16.

During operation, three or more devices 12 connect with conference bridge 16 to participate in a conferenced voice communication session. During the voice communication session, conference bridge 16 receives audio input from one or more of the participants, mixes the audio input to generate a conference audio stream, and supplies this conference audio stream to each of the participants. During the conference, one or more of the participants may request replay of selected portions of the conference audio stream. Replay module 18 provides this functionality.

According to particular embodiments, replay module 18 provides a "conference-on-hold" service. For this service, replay module 18 enables storage and replay of a conference audio stream for participants that place a conference on hold. For example, consider a conference call having three participants. When one of the participants places the conference on hold, replay module 18 may begin storing the conference audio stream from conference bridge 16. When the participant wishes to rejoin the conference, replay module 18 replays a sped-up version of the buffered conference audio stream to the returning participant. When the sped-up replay reaches the point of the real-time communications for the conference, the participant is reentered into the conference. Using this technique, the rejoining conference participant need not burden the other conference participants for a recapitulation.

According to another embodiment, replay module 18 provides a "conference buffering" service for one or more on-going conferences. For this service, replay module 18 buffers some portion of a conference audio stream while a conference is in progress. For example, replay module 18 may buffer the immediately preceding five minutes of a conference audio stream. Participants of the conference may then access and replay this buffered audio. Thus, for example, if a conference participant steps out or for any other reason misses portions of a conference, that participant can request a replay of some portions of buffered conference audio. In response to the request, replay module 18 may replay a predetermined amount of buffered audio or an amount indicated by the request. Using this technique, a conference participant can access missed portions of conference audio without first providing an on-hold indication. Also, during playback of buffered audio, replay module 18 may accelerate the speed of the audio playback.

To provide the accelerated replay of buffered conference audio streams, replay module 18 may use any suitable techniques. According to particular embodiments, replay module 18 uses a pitch-invariant time-scale-modified playback technique to replay stored audio. With pitch-invariant time-scale-modified playback, a digital signal processing algorithm time compresses an audio stream without changing pitch. For example, a particular time invariant playback scheme separates audio into frames, overlaps the frames a sufficient amount to achieve a target time compression, and aligns the frames to prevent audio abnormalities that may result from phase changes at the boundaries and then adds the frames together. By using pitch-invariant time-scale-modified playback, replay module 18 can quickly catch a participant up with an on-going conference without subjecting that participant to "chipmunk" voices during playback.

System 10 contemplates replay module 18 using any appropriate speed for replaying conference audio streams. Particular embodiments envision replay module 18 using speeds less than three times normal playback speed, with a default at approximately two times normal playback speed. However, because each playback by replay module 18 potentially involves a different listener and speakers, replay module 18 may support user selected replay speeds.

According to another embodiment, replay module 18 uses a layering technique to enable a user to replay buffered audio while simultaneously listening to the ongoing conference. For example, replay module 18 may provide the user with combined audio from both the buffered audio and the ongoing conference, while adjusting relative volumes of the two streams to make one or the other more dominant. The user may potentially control these volumes to place more emphasis on the buffer replay or the ongoing conference. These layering techniques may be used as an alternative to or in combination with accelerated playback techniques.

Moreover, replay module 18 may support more advanced layering techniques. For example, if the user has a stereo listening device is available (such as stereo headphones), the playback could be superimposed over the live conference using three-dimensional audio layering techniques. Replay module 18 may accomplish this layering using any suitable techniques, such as head-related transfer functions (HRTFs), such that the ongoing conference sounds like background conversation. These various layering techniques may provide many advantages. For example, someone in the live conference may be able to get the attention of the person listening to the playback.

The examples above illustrate the various operations of replay module 18 to provide conference audio replay, with particular focus on the conference on-hold and conference buffering services. However, system 10 contemplates replay module 18 providing conference replay functions for any appropriate scenario during a conference call. Moreover, while described in relation to a voice conference, the techniques described may be applied to other types of communication sessions, such as video conferences.

Figure 2:
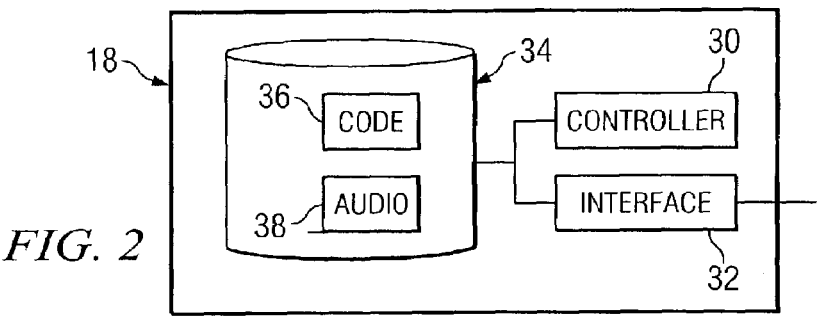
FIG. 2 is a block diagram illustrating an exemplary replay module from the system.

FIG. 2 is a block diagram illustrating exemplary functional components for replay module 18. In the embodiment illustrated, replay module 18 includes a controller 30, an interface 32, and a memory 34. In general, these elements of replay module 18 operate to provide replay of portions of conference audio to selected conference participants while a conference call is in progress.

Controller 30 represents any suitable element or elements for controlling the operation of replay module 18. For example, controller 30 may represent a microprocessor or other similar element. Interface 32 represents any suitable hardware and/or logic enabling access to the functions of replay module 18. According to particular embodiments, replay module 18 may be implemented within elements of network 14. In these circumstances, interface 32 may enable network communication with other elements, such as conference bridge 16 and devices 12. In other embodiments, the functionality of replay module 18 may be implemented within other elements, such as within selected devices 12. In these circumstances, interface 32 may represent hardware or logic modules for interfacing with other components and/or logic operating within the device. Thus, as shown by these two basic embodiments, the configuration and operation of interface 32 depends upon the particular implementation and location of replay module 18.

In the embodiment illustrated, replay module 18 also includes memory 34, which maintains code 36 and audio 38. Code 36 represents software modules, configurations, and/or other suitable logic for use by replay module 18 during operation. For example, code 36 may include software for execution by controller 30 to provide conference replay functions. Audio 38 includes stored conference audio streams for one or more conferences. However, while memory 34 is illustrated as maintaining particular types of information, system 10 contemplates memory 34 storing any suitable information for use by replay module 18 for providing conference audio replay functions.

In the following description, the operation of replay module 18 will be described with respect to its operation as both a conference on-hold replay device and a conference audio buffering device. Moreover, the description will focus on the operation of replay module 18 as a separate element located within network 14. However, as previously discussed, system 10 contemplates replay module 18 providing any suitable conference audio replay functions, with the functions of replay module 18 being incorporated within any one or more elements of system 10.

During operation, replay module 18 monitors for commands from other elements of system 10, such as devices 12 and conference bridge 16. These commands enable replay module 18 to store appropriate conference audio streams. For conference buffering services, replay module 18 links to an active conference and buffers some amount of the conference audio stream from that conference. Thus, for example, when establishing a conference call, conference bridge 16 may contact replay module 18, request buffering services from replay module 18, and then provide conference audio from the on-going conference to replay module 18. During the conference, participating devices 12 may contact replay module 18 either directly or via conference bridge 16, and request replay of buffered conference audio. In response, replay module 18 provides the buffered conference audio to the requesting device 12, potentially providing this replay using accelerated pitch-invariant time-scale-modified playback. After the replay of the buffered audio, the requesting participant can rejoin the ongoing conference.

For conference on-hold services, replay module 18 need not buffer conference audio until one or more of the conference participants enables the specialized conference hold feature. Upon one or more devices 12 initiating conference hold, those devices 12 and/or conference bridge 16 may contact replay module 18 to request buffering of the conference audio stream. Replay module 18 then buffers the conference audio until the requesting device 12 indicates a desire to rejoin the conference. Replay module 18 then, as previously discussed, uses accelerated replay of the conference audio to quickly bring the requesting device 12 up to speed with the real-time conference audio. The participant may then rejoin the real-time conference.

The preceding description provides examples of the operation of replay module 18 according to two different embodiments. However, while FIG. 2 and the preceding description focus on particular embodiments of replay module 18 that includes specific elements providing particular services, system 10 contemplates replay module 18 having any suitable combination and arrangement of elements providing replay of conference audio. Thus, the functionalities performed by the particular elements illustrated may be separated or combined as appropriate, and functionalities of some or all of these elements may be implemented by logic encoded in media. Moreover, as previously discussed, some or all of the functionalities of replay module 18 may be distributed among other elements of system 10. In addition, system 10 contemplates replay module 18 providing any other suitable conference audio replay functions for participants of a conference.

Figure 3:
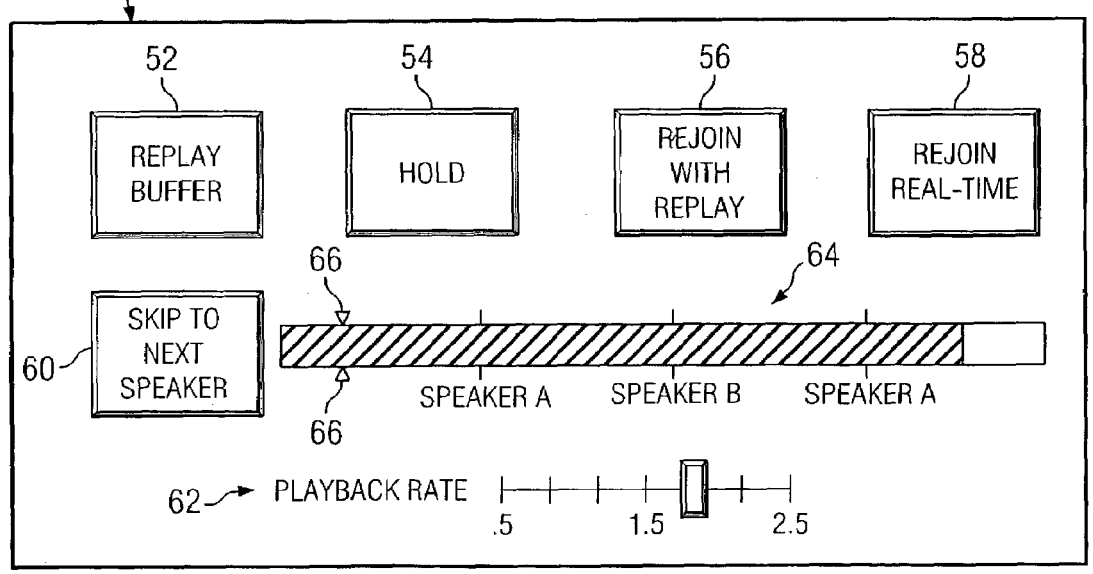
FIG. 3 is an exemplary user interface for accessing conference audio replay services.

FIG. 3 is a graphical user interface, indicated generally at 50, that provides access to and interaction with the functions of replay module 18. During operation, conference bridge 16 and/or replay module 18 may present interface 50 to devices 12 to permit user interaction with the features of replay module 18. Interface 50 includes a number of input elements, including a replay buffer button 52, a hold button 54, a rejoin-with-replay button 56, a rejoin real-time button 58, a skip-to-next-speaker button 60, and a playback rate selector 62. In addition, interface 50 includes a replay operation indicator 64 that provides information on the current operation of replay module 18.

Replay buffer button 52 enables a conference participant to request replay of conference audio buffered by replay module 18. For example, in response to a user selecting replay buffer button 52, device 12 may send a request to conference bridge 16 or directly to replay module 18. In response to the request, replay module 18 may play back some or all buffered conference audio to the requesting device 12. However, the availability of replay buffer button 52 and the underlying service depends on whether or not replay module 18 actively buffers audio for the on-going conference.

Hold button 54 accesses the specialized conference on-hold features provided by replay module 18. For example, in response to a user selecting hold button 54, device 12 may communicate a hold indication to conference bridge 16 and/or replay module 18. In response to this indication, replay module 18 may begin or continue buffering conference audio to ensure that this audio stream is stored while device 12 is on-hold. After selecting hold button 54, interface 50 may enable rejoin-with-replay button 56 and rejoin real-time button 58.

Rejoin-with-replay button 56 accesses the replay features of replay module 18 for conference audio buffered in response to an indication from hold button 54. For example, at some point after selecting hold button 54, a user may select rejoin-with-replay button 56 to access the buffered audio in replay module 18. In response, replay module 18 streams the buffered audio to device 12 until the participant is caught up with real-time conference proceedings. Device 12 then reconnects with the real-time conference audio stream for the conference.

Rejoin real-time button 58, which may be selected at any point while on hold or replaying audio, instantly rejoins device 12 with any real-time conference proceedings. For example, to return from hold without accessing the replay functions of replay module 18, a user may select rejoin real-time button 58. Similarly, during a replay, the user may skip over the remaining buffered audio by selecting rejoin real-time button 58.

Next speaker button 60, which may be enabled during replay of audio, enables a user to skip forward through buffered audio based upon the active speakers. The skip-tonext-speaker function may be leveraged on the ability of conference bridge 16 to identify active speakers during a conference. According to particular embodiments, conference bridge 16 may include features for identifying particular devices 12 that are currently contributing to a conference audio stream. During a conference, conference bridge 16 may select some subset of participating devices 12 to contribute to the active conference audio stream. For example, conference bridge 16 may mix the top three received audio signals together to form a conference audio stream. Conference bridge 16 can use any appropriate techniques for selecting these "active" participants. In addition to speaker selection operations, conference bridge 16 may also track the identity of participants in a conference. By combining the identity information with the knowledge of the current active speaker or speakers, conference bridge 16 can provide replay module 18 information indicating the current speaker for portions of buffered audio. Using this information, replay module 18 can respond to next speaker skip requests. Using the skip-to-next-speaker function, device 12 may more quickly scan through buffered audio.

Playback rate selector 62 selects the rate at which replay module 18 replays buffered audio. In the embodiment illustrated, selector 62 permits a user to choose a playback speed within the range of one half to 2.5 times the normal audio speed. This permits a user to slow down or speed up audio replay as desired. Moreover, as previously noted, replay module 18 may use time invariant playback techniques to enable conference audio replay at faster or slower speeds without affecting the pitch of the audio stream.

Replay operation indicator 64 presents various information regarding the operation of replay module 18. In the embodiment illustrated, indicator 64 includes a fill bar that indicates an amount of buffered audio. If the conference has a set or otherwise know duration, this fill bar can indicate both the amount of buffered audio and the portion of the conference that is currently buffered. Indicator 64 further includes playback arrows 66 showing the current progress of playback. Indicator 64 also provides information on active speakers at various locations within the buffered audio stream. Thus, for example, using well-known drag-and-drop techniques, a user may move playback arrows 66 to skip forward or backward through buffered audio. However, while interface 50 is illustrated and described as including particular indicators and input mechanisms, system 10 contemplates devices 12 using any suitable interfaces and techniques for accessing the features for replay module 18. Thus, while interface 50 illustrates a rather advanced graphical interface, system 10 contemplates devices 12 accessing the features of replay module 18 using any suitable techniques. For example, replay module 18 may respond to voice, dual tone multi-frequency (DTMF), or other suitable in-band or out-of-band signaling. Moreover, the particular methods used to access the features of replay module 18 may depend upon the sophistication and compatibility of devices 12 accessing a conference. Therefore, system 10 contemplates replay module 18 using any suitable techniques for providing conference audio replay features to conference participants.

Figure 4:
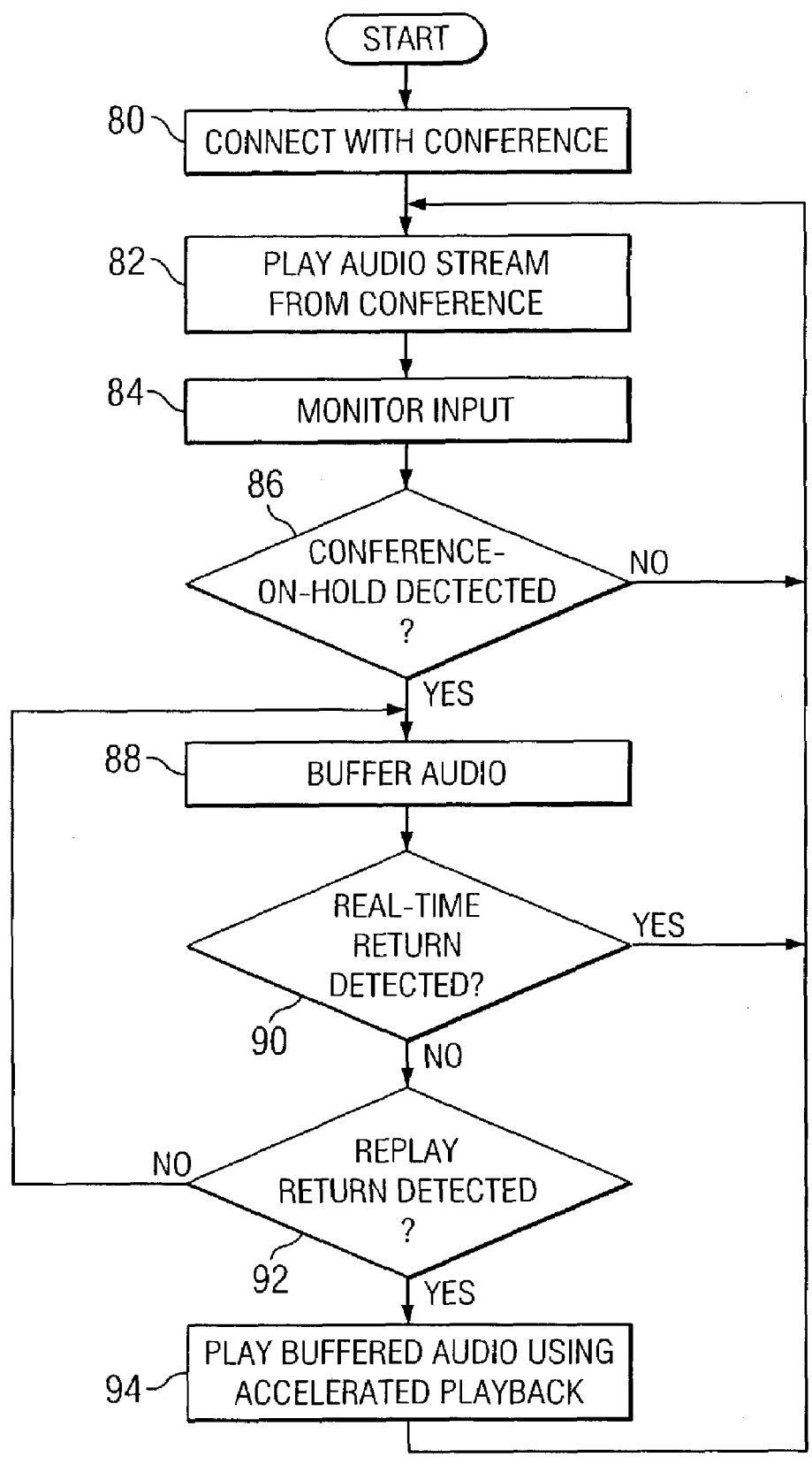
FIG. 4 is a flowchart illustrating a method for a conference participant to replay portions of conference audio.

FIG. 4 is a flowchart illustrating a method for a conference participant to access conference on-hold replay functions of replay module 18. Device 12 connects with a conference at step 80. For example, device 12 may connect with conference bridge 16 to access a conference. While the conference is on-going, device 12 plays the audio stream from the conference at step 82. This audio stream represents, for example, the mixed audio signals generated by conference bridge 16 based upon selection of active speakers. While playing the audio stream, device 12 may monitor input at step 84 and determine whether the user has indicated a conference on-hold request at step 86.

Upon detecting a conference on-hold indication, replay module 18 buffers the conference audio stream at step 88. While the audio is buffered, device 12 and/or replay module 18 monitor for user input. If a real-time return indication is detected at step 90, device 12 begins playing the real-time audio stream from the conference at step 82 without first replaying any buffered audio. If a rejoin conference with replay indication is detected at step 92, replay module 18 plays the buffered audio using accelerated playback at step 94. While not explicitly shown in the flowchart, replay module 18 continues to buffer conference audio while the performing the accelerated playback. Once the accelerated playback reaches the point of real-time communications in the conference, device 12 is reconnected and begins playing the real-time audio stream from the conference at step 82. The reconnection to the real-time audio may occur without any additional input from the user. Thus, the user need not replay the buffer and then explicitly request to return to the conference.

Therefore, the preceding flowchart and accompanying description illustrate a particular method for device 12 and replay module 18 to provide conference audio replay functions for a user. However, the preceding flowchart and accompanying description illustrate only an exemplary method of operation, and system 10 contemplates replay module 18, devices 12 and/or other suitable components using any appropriate techniques to provide conference audio replay functionality. Thus, many of the steps in this flowchart may take place simultaneously and/or in different orders than as shown. In addition, device 12 and replay module 18 may use methods with additional steps, fewer steps, and/or different steps, so long as the methods remain appropriate. Moreover, while this flowchart illustrates a method for accessing conference on-hold features of replay module 18, system 10 contemplates elements using similar techniques for accessing other replay features, such as buffer replay, provided by replay module 18.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for providing conference audio replay comprising:
   connecting to a voice communication session operable to interconnect three or more participants;
   receiving a call on-hold indication;
   disabling output of a real-time audio stream from the voice communication session;
   storing the real-time audio stream from the voice communication session into a buffered audio stream;
   receiving a replay return indication;
   providing an accelerated playback of the buffered audio stream;
   receiving a skip-to-next-speaker indication while providing the accelerated playback;
   in response to the skip-to-next-speaker indication, determining a next speaker change location in the buffered audio stream and skipping the accelerated playback to the next speaker change location in the buffered audio stream; and enabling output of the real-time audio stream from the voice communication session upon finishing playback of the buffered audio stream.

2. The method of claim 1, further comprising providing the accelerated playback using a pitch-invariant time-scale-modified playback scheme that accelerates playback of the buffered audio stream without significantly affecting pitch of the buffered audio stream during playback.

3. The method of claim 2, wherein the pitch-invariant time-scale-modified playback scheme accelerates playback of the buffered audio stream by at least 1.5 times regular speed of the buffered audio stream.

4. The method of claim 1, further comprising:
receiving a real-time rejoin indication while providing the accelerated playback; and
in response to the real-time rejoin indication, halting the accelerated playback and enabling output of the real-time audio stream from the voice communication session.

5. The method of claim 1, further comprising, in response to receiving the call on-hold indication, displaying a graphical user interface having replay operation indicator and a plurality of input elements.

6. The method of claim 1, wherein the input elements comprise a replay rejoin button, a real-time rejoin button, and a skip-to-next-speaker button.

7. A conference replay module comprising:
an interface operable to connect to a voice communication session interconnecting three or more participants;
a memory operable to store a real-time audio stream from the voice communication session into a buffered audio stream; and
a controller operable to detect a call on-hold indication from a requesting one of the participants, to detect a replay return indication from the requesting participant, to provide an accelerated playback of the buffered audio stream to the requesting participant in response to the replay return indication, to receive a skip-to-next-speaker indication while providing the accelerated playback, and, in response to the skip-to-next-speaker indication, to determine a next speaker change location in the buffered audio stream and to skip the accelerated playback to the next speaker change location in the buffered audio stream, the controller further operable to enable output of the real-time audio stream from the voice communication session to the requesting participant upon finishing playback of the buffered audio stream.

8. The conference replay module of claim 7, wherein the controller is further operable to provide the accelerated playback using a pitch-invariant time-scale-modified playback scheme that accelerates playback of the buffered audio stream without significantly affecting pitch of the buffered audio stream during playback.

9. The conference replay module of claim 8, wherein the pitch-invariant time-scale-modified playback scheme accelerates playback of the buffered audio stream by at least 1.5 times regular speed of the buffered audio stream.

10. The conference replay module of claim 7, wherein the controller is further operable to:
receive a real-time rejoin indication from the requesting participant while providing the accelerated playback; and
in response to the real-time rejoin indication, halt the accelerated playback and enable output of the real-time audio stream from the voice communication session to the requesting participant.

11. The conference replay module of claim 7, wherein the controller is further operable, in response to receiving the call on-hold indication, to provide a graphical user interface for display by the participant, the graphical user interface having replay operation indicator and a plurality of input elements.

12. The conference replay module of claim 7, wherein the input elements comprise a replay rejoin button, a real-time rejoin button, and a skip-to-next-speaker button.

13. Logic for providing conference audio replay, the logic encoded in media and operable when executed to perform the steps of:
connecting to a voice communication session operable to interconnect three or more participants;
receiving a call on-hold indication;
disabling output of a real-time audio stream from the voice communication session;
storing the real-time audio stream from the voice communication session into a buffered audio stream;
receiving a replay return indication;
providing an accelerated playback of the buffered audio stream;
receiving a skip-to-next-speaker indication while providing the accelerated playback;
in response to the skip-to-next-speaker indication, determining a next speaker change location in the buffered audio stream and skipping the accelerated playback to the next speaker change location in the buffered audio stream; and
enabling output of the real-time audio stream from the voice communication session upon finishing playback of the buffered audio stream.

14. The logic of claim 13, further comprising providing the accelerated playback using a pitch-invariant time-scale-modified playback scheme that accelerates playback of the buffered audio stream without significantly affecting pitch of the buffered audio stream during playback.

15. The logic of claim 14, wherein the pitch-invariant time-scale-modified playback scheme accelerates playback of the buffered audio stream by at least 1.5 times regular speed of the buffered audio stream.

16. The logic of claim 13, further comprising:
receiving a real-time rejoin indication while providing the accelerated playback; and
in response to the real-time rejoin indication, halting the accelerated playback and enabling output of the real-time audio stream from the voice communication session.

17. The logic of claim 13, further comprising, in response to receiving the call on-hold indication, displaying a graphical user interface having replay operation indicator and a plurality of input elements.

18. The logic of claim 13, wherein the input elements comprise a replay rejoin button, a real-time rejoin button, and a skip-to-next-speaker button.

19. A conference replay module comprising:
means for connecting to a voice communication session operable to interconnect three or more participants;
means for receiving a call on-hold indication;
means for disabling output of a real-time audio stream from the voice communication session;
means for storing the real-time audio stream from the voice communication session into a buffered audio stream;
means for receiving a replay return indication;

means for providing an accelerated playback of the buffered audio stream; receiving a skip-to-next-speaker indication while providing the accelerated playback;

in response to the skip-to-next-speaker indication, determining a next speaker change location in the buffered audio stream and skipping the accelerated playback to the next speaker change location in the buffered audio stream; and means for enabling output of the real-time audio stream from the voice communication session upon finishing playback of the buffered audio stream.

20. A conference replay module comprising:

an interface operable to connect to a voice communication session interconnecting three or more participants;

a memory operable to store a real-time audio stream from the voice communication session into a buffered audio stream; and a controller operable to detect a call on-hold indication from a requesting one of the participants, to detect a replay return indication from the requesting participant, to provide an accelerated playback of the buffered audio stream to the requesting participant in response to the replay return indication, and to enable output of the real-time audio stream from the voice communication session to the requesting participant upon finishing playback of the buffered audio stream, wherein the controller is further operable to provide the accelerated playback using a pitch-invariant time-scale-modified playback scheme that accelerates playback of the buffered audio stream by at least 1.5 times regular speed without significantly affecting pitch of the buffered audio stream during playback.

21. A method for providing conference audio replay comprising:

connecting to a voice communication session operable to interconnect three or more participants, the voice communication session generating a real-time audio stream;

storing a portion of the real-time audio stream into a buffered audio stream;

receiving a replay audio indication;

combining the buffered audio stream with the real-time audio stream to generate a layered audio stream; and providing the layered audio stream as output for at least one of the participants.

* * * * *